(12) United States Patent
LaBerge

(10) Patent No.: US 7,516,281 B2
(45) Date of Patent: Apr. 7, 2009

(54) ON-DIE TERMINATION SNOOPING FOR 2T APPLICATIONS IN A MEMORY SYSTEM IMPLEMENTING NON-SELF-TERMINATING ODT SCHEMES

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 428 days.

(21) Appl. No.: 10/853,319

(22) Filed: May 25, 2004

(65) Prior Publication Data
US 2005/0268059 A1    Dec. 1, 2005

(51) Int. Cl.
*G06F 13/00* (2006.01)
(52) U.S. Cl. .................. 711/154; 711/105; 713/500; 365/189.01
(58) Field of Classification Search .......... 711/154, 711/105; 365/189.01; 713/500
See application file for complete search history.

(56) References Cited

U.S. PATENT DOCUMENTS

| | | | | |
|---|---|---|---|---|
| 6,742,098 B1 * | 5/2004 | Halbert et al. | ............... | 711/172 |
| 6,894,946 B2 * | 5/2005 | Jang | ............... | 365/233 |
| 7,092,299 B2 * | 8/2006 | Kwak et al. | ............... | 365/63 |
| 2003/0126338 A1 * | 7/2003 | Dodd et al. | ............... | 710/305 |
| 2004/0098528 A1 * | 5/2004 | Janzen | ............... | 710/305 |

* cited by examiner

Primary Examiner—Hong Kim
(74) Attorney, Agent, or Firm—Jones Day; Edward L. Pencoske

(57) ABSTRACT

A method and apparatus for controlling the on-die termination of a memory system. The method comprises snooping a command bus in response to a first plurality of command signals clocked at 1T and enabling the on-die termination in response to a second plurality of command signals clocked at 2T and the first plurality of command signals. The apparatus may be a memory device comprising a memory array responsive to a plurality of command signals, a data bus having at least one of a data pad, a data strobe output pad, and an input data mask pad, an activation circuit responsive to certain of the plurality of command signals and operable to produce a control signal, and a termination circuit responsive to the control signal and operable to apply an effective resistance to at least one of the data pad, the data strobe output pad, and the input data mask pad.

27 Claims, 9 Drawing Sheets

ON-DIE TERMINATION SNOOPING FOR 2T APPLICATIONS IN A MEMORY SYSTEM IMPLEMENTING NON-SELF-TERMINATING ODT SCHEMES

BACKGROUND OF THE INVENTION

The present invention relates generally to memory systems and more particularly to memory systems which incorporate on-die termination.

A typical memory system includes a memory controller and one or more memory modules (for example, dual in-line memory modules or DIMMs). Each memory module may include a plurality of memory devices (such as a dynamic random access memory (DRAM), synchronous dynamic random access memory (SDRAM), double data rate synchronous dynamic random access memory (DDR SDRAM), etc.). For example, a DIMM typically has eighteen (18) memory devices divided into two ranks. The first rank, comprised of nine (9) memory devices, is located on the front side of the DIMM and the second rank, also comprised of nine (9) memory devices, is located on the back side of the DIMM.

Data is written to and read from the memory devices under the direction of the memory controller. Commands and addresses are transmitted unidirectionally (i.e., from the memory controller to the memory devices) via a command/address bus. The memory controller typically provides address information via a single command/address bus simultaneously to all of the memory devices in the system. Thus, the command/address bus tends to encounter high capacitive loading. For example in a two rank system, the command/address bus it said to be "two-rank loaded", in a three rank system, the command/address bus it said to be "three-rank loaded", etc. It should be apparent to one skilled in the art that for the command/address bus, a "rank" of loading in the current embodiment refers to nine (9) loads (i.e., one load for each memory device).

A subset of the command/address bus may be sent to each individual rank. For example in a two rank system, one copy of the control pins CS#, CKE, and ODT may be connected to rank-0 via one set of leads and another copy of the control pins CS#, CKE, and ODT may be connected to rank-1 via another set of leads. Thus, each copy of the subset of the command/address bus is said to be "single-rank loaded".

In contrast to the command/address bus, data is transmitted bi-directionally to and from those memory devices addressed by the memory controller via a data bus. Data may be sent to or retrieved from a single memory device. The data bus may include a plurality of byte lanes, each byte lane having a conductor for each bit in a memory device. For example, a memory system may be comprised of two DIMMS each having two ranks (for a total of four ranks). Each rank may be comprised of nine memory devices, each having eight bits (thus, each rank has 8×9=72 bits). Accordingly, the data bus will have nine byte lanes (i.e., one for each memory device in the ranks), each byte lane having eight conductors (one for each bit in a memory device). Each byte lane is connected to all four ranks (e.g., the most significant byte in each rank is connected to a first byte lane, the next most significant byte in each rank is connected to a second byte lane, etc. for each byte in the rank). Accordingly, each byte lane in the instant example is "loaded with four ranks". It should be apparent to one skilled in the art that for the data bus, a "rank" of loading refers to one (1) pin (i.e., one pin for each memory device on the byte lane). Due to the topography of the data bus and the manner in which data is transmitted, the capacitive loading on the data bus is low compared to the capacitive loading on the command/address bus.

As a result of the differences in capacitive loading between the data bus and the command/address bus, it is possible to transmit the data at a higher rate than the commands/addresses. For example in a DDR SDRAM, data is "strobed" at twice the rate as the commands (i.e., commands are transferred on the rising edge of a command strobe, whereas the data is transferred on both the rising and falling edges of a data strobe).

The memory system may include on-die termination (ODT). Generally speaking, ODT applies a resistance to one or more input/output pads (for example, connected to the data bus) within a memory device. ODT provides termination to reduce bus signal reflections, thereby improving the integrity of the transmitted signal.

Typically, the memory controller independently enables/disables the ODT for one or more ranks of memory devices within the memory system. This ODT scheme may be referred to as pin controlled ODT. For example, the memory controller may use a chip select signal (CS0#) to designate a DIMM's front rank (i.e., rank-0) to complete a read operation and/or a write operation. The memory controller enables the ODT pin for the DIMM's back rank (i.e., rank-1). The back rank receives the ODT command signal and its data bus is terminated (e.g., resistances are applied to one or more input/output pads of the memory devices within the back rank per the ODT signal).

This conventional pin-controlled ODT scheme, however, has several drawbacks. First, additional pin-outs are needed for the memory controller, the DIMM connector, and each memory device. For example, the DIMM has two ODT pins, one for each rank. Each of the DIMMs ODT pins is connected to separate pins on the memory controller so that one rank of the DIMM can receive ODT command signals from the memory controller independently of the DIMM's other rank. Additionally, each memory device in the rank also has an ODT pin that is connected with its associated rank's ODT pin so that each memory device in the rank is terminated at the same time. In addition to the increased number of pin outs, the memory controller of the conventional pin-controlled ODT scheme is required to provide the ODT command signals to the other components of the memory system. Thus, the complexity of the memory controller and the hardware required to operate the memory controller increases, especially as the number of memory modules increases.

Because of the problems encountered with the increased pin count and memory controller complexity, it is desirable to find alternative methods for implementing ODT. "Bus snooping" has been used as an alternative to the pin-controlled ODT scheme. Snooping may be divided into three categories: self-terminating, non-self terminating, and combined self/non-self terminating.

In self terminating snooping, a memory rank inspects the command/address bus and determines whether it is the target of a pending operation (e.g., whether a write or read is intended for the rank). If the memory rank determines that it is the target of a pending operation, snooping is suspended and the operation executed. If the memory rank determines that it is not the target of the pending operation, it may issue its own ODT command (independently from the memory controller) and resistances are applied to one or more input/output pads of the memory devices within the memory rank.

In non-self terminating snooping, a first memory rank inspects the command/address bus and determines whether another memory rank is the target of a pending operation (e.g., whether a write or read is intended for another memory rank). If the first memory rank determines that another memory rank is the target of a pending operation, the first memory rank may issue its own ODT command (independently from the memory controller) and resistances are applied to one or more input/output pads of the memory devices within the first memory rank.

For the combined self/non-self terminating snooping, the first memory rank inspects the command/address bus and determines whether it or another rank are the target of a pending operation. If the first memory rank determines that it is the target of a pending operation, snooping is suspended and the operation is executed. If the first memory rank determines that it is not the target of the pending operation and/or if the first memory rank determines that another rank is the target of a pending operation, it may issue its own ODT command (independently from the memory controller) and resistances are applied to one or more input/output pads of the memory devices within the first memory rank.

The memory system may operate at 1T or 2T. It should be noted that 1T operation refers to a control scheme wherein the commands are asserted for a single clock pulse, whereas 2T operation refers to a control scheme wherein commands are asserted for two consecutive clock pulses. 2T operation is compatible with self-termination because the column select (CS#) signal qualifies the second clock cycle on the command/address bus (i.e., indicates which rank is intended to receive the information in the second clock cycle). However, 2T operation is problematic with the non-self terminating and the combined self/non-self terminating ODT schemes because the first clock pulse in the 2T cycle may be invalid. For example during bus snooping, a first rank may erroneously interpret the presence of a command intended for another rank at the first clock pulse in the 2T cycle, when in actuality the command bus is merely transitioning between states during the first clock pulse in the 2T cycle. FIG. 8 illustrates this problem.

FIG. 8 shows timing waveforms of on-die termination for a memory rank using a prior art SDRAM running at 2T. At to, the chip select signals for rank-0 (i.e., CS#0) and rank-1 (i.e., CS#1) are inactive (i.e., high) and both ranks snoop the command bus. At $t_1$, the command bus (CMD) is transitioning to a READ command sent from the memory controller that is intended for rank-0 (as seen by rank-0 being active at $t_2$). During this transition period, rank-1 may erroneously interpret the presence of a command (e.g., read, write, etc.) when none is intended. Similarly at $t_6$, the command bus is transitioning to a WRITE command that is intended for rank-0 (as seen by rank-0 being active at $t_7$). During this transition period, rank-1 may erroneously interpret the presence of a command (e.g., read, write, etc.) when none is intended. The CS# signal qualifies the second clock in a 2T system, thus CS# must run at 1T. This is possible, however, because CS# has reduced capacitive loading due to the fact that each rank receives a unique CS# signal.

Thus, there exists a need for an apparatus and method for a memory system that overcomes the limitations inherent to the self-terminating ODT scheme and permits 2T operation of the memory system while overcoming the limitations inherent to the non-self terminating and combined self/non-self terminating ODT schemes.

SUMMARY OF THE INVENTION

One aspect of the present invention relates to a method for controlling the on-die termination of a memory system having a plurality of memory devices, a command bus, and a data bus. The method comprises snooping the command bus, wherein the snooping is responsive to a first plurality of command signals clocked at 1T, and enabling the on-die termination of the memory device, wherein the enabling is responsive to a second plurality of command signals clocked at 2T and the first plurality of command signals clocked at 1T.

Another aspect of the present invention relates to a method for terminating a data bus within a memory device of a memory system. The method comprises monitoring a command bus within the memory system if a first plurality of signals define a monitoring state for the memory device, and enabling a circuit for terminating the data bus if the first plurality of signals and a second plurality of signals define a command function for another memory device within the memory system, wherein the first plurality of signals are clocked at 1T and wherein the second plurality of signals are clocked at 2T.

Another aspect of the present invention relates to a memory device comprising a memory array responsive to a plurality of command signals, a data bus having at least one of a data pad, a data strobe output pad, and an input data mask pad for carrying data to and from of the memory array, an activation circuit responsive to certain of the plurality of command signals and operable to produce a control signal, and an termination circuit responsive to the control signal and operable to apply an effective resistance to at least one of the data pad, the data strobe output pad, and the input data mask pad. The memory device may be incorporated into a memory system.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

Figure 1:
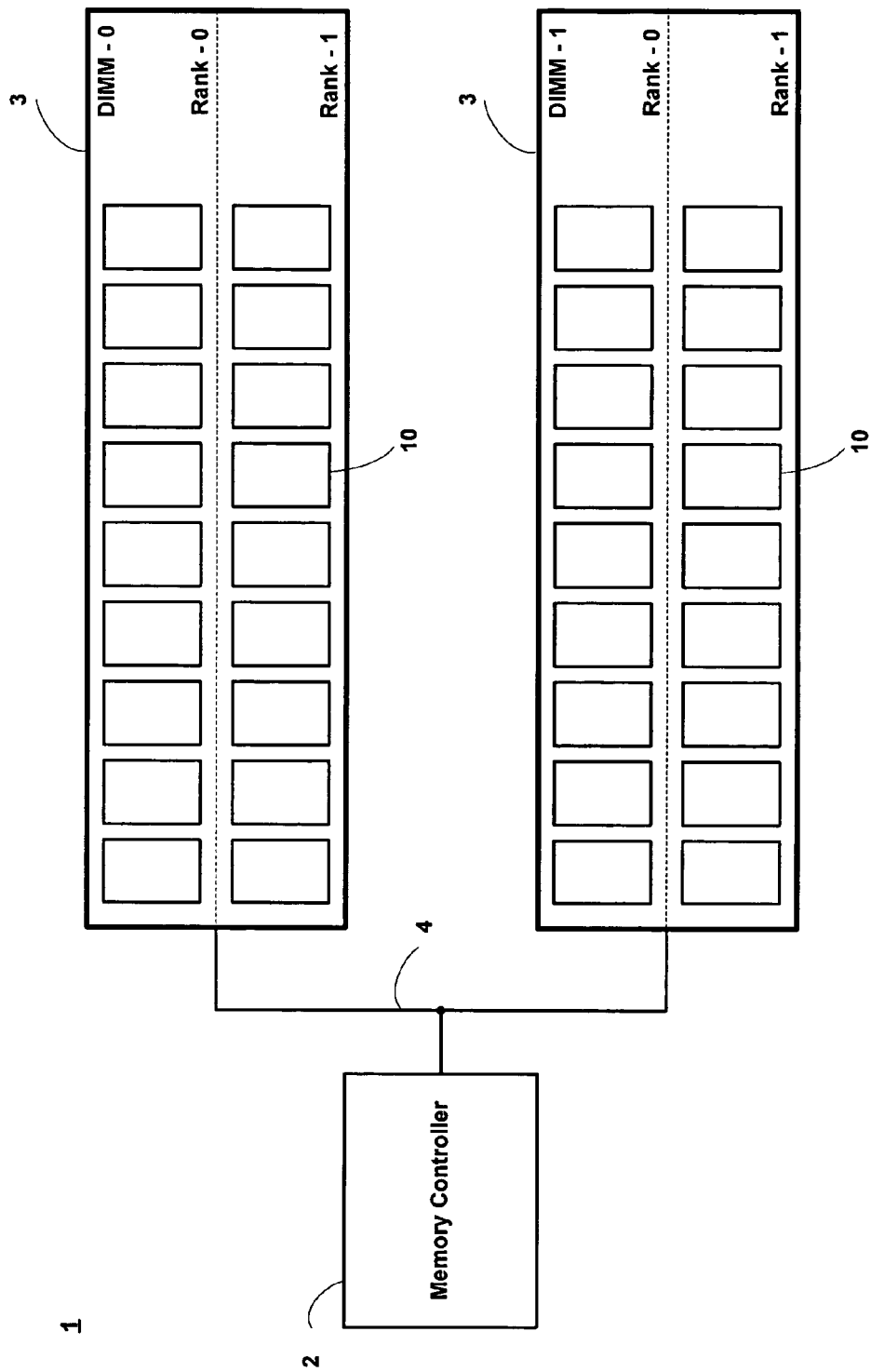
FIG. 1 is a simplified block diagram of a memory system according to one embodiment.

FIG. 1 is a simplified block diagram of a memory system 1 according to one embodiment. The memory system 1 includes a memory controller 2 and two (2) dual-inline-memory-modules 3 (i.e., DIMM-0, DIMM-1). Each memory module 3 is divided into two (2) ranks (Rank-0, Rank-1), each rank being comprised of nine (9) synchronous dynamic random access memory devices (SDRAM) 10. The use of an SDRAM is for exemplary purposes only and is not intended, in any manner, to limit the scope of the present invention. It should be apparent to those skilled in the art that other types of memory devices may be used, and the number of memory modules and ranks varied, while remaining within the scope of the present invention.

The memory controller 2 and memory modules 3 communicate via a system bus 4. In the current embodiment, the system bus 4 carries command signals, address signals, and data signals, among others. The system bus 4 may be subdivided into two or more buses, for example a command bus, an address bus, and a data bus. The command bus may carry the row address strobe (RAS#), column address strobe (CAS#), and write enable (WE#) command signals, among others. The address bus may carry bank address (BA0, BA1) and address input (A0-A12) signals, among others. The data bus may carry data input/output signals (DQ0-DQ15), data strobe signals (LDQS, LDQS#, UDQS, UDQS#), and data mask signals (LDM, UDM), among others. Additionally, rank specific command signals, such as the chip select (CS#), clock enable (CKE), and on-die termination (ODT) signals may be carried by another portion of the system bus 4. It should be apparent to one skilled in the art that the topology of the system bus 4 (and its component parts) may be varied while remaining within the scope of the present invention.

Figure 2:
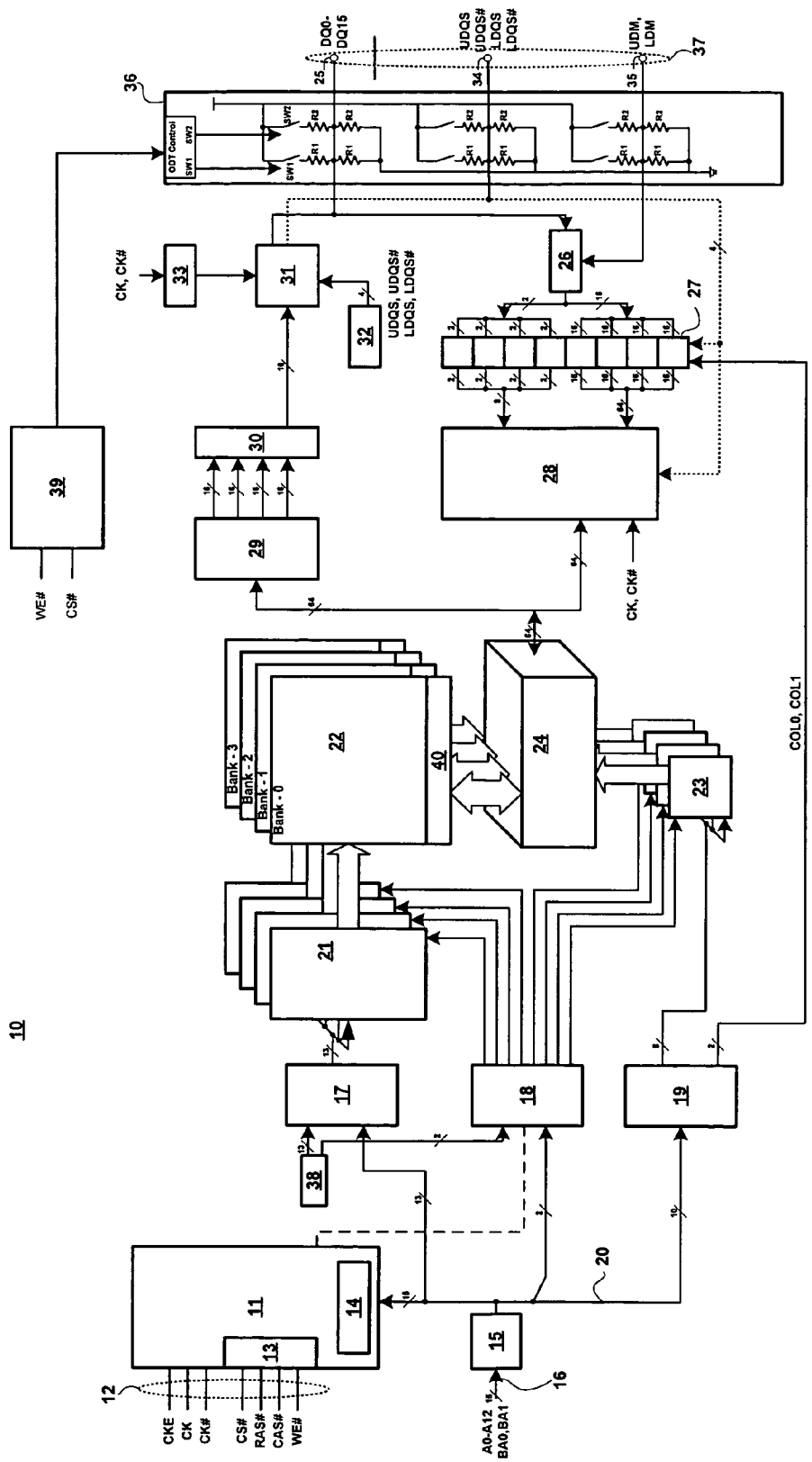
FIG. 2 illustrates a simplified functional block diagram of an architecture for the memory device of FIG. 1 according to one embodiment.

FIG. 2 illustrates a simplified functional block diagram of an architecture for an SDRAM 10 of FIG. 1 according to one embodiment. The SDRAM 10 includes a control logic 11 responsive to a plurality of command signals (e.g., CS#, RAS#, CAS#, WE#, CKE, CK, CK#, ADR, BA, etc.) from a command bus 12. The control logic 11 includes a command decode circuit 13 and mode register circuits 14, among others. Table 1 illustrates a truth table for the command coding of the SDRAM 10 according to the current embodiment.

TABLE 1

SDRAM Coding Truth Table (L = 0, active; H = 1, inactive).

| FUNCTION | CKE Previous Cycle | CKE Current Cycle | CS# | RAS# | CAS# | WE# |
|---|---|---|---|---|---|---|
| Write | H | H | L | H | L | L |
| Read | H | H | L | H | L | H |
| Bank Activate | H | H | L | L | H | H |
| Load Mode | H | H | L | L | L | L |
| Refresh | H | H | L | L | L | H |
| Self-Refresh Entry | H | L | L | L | L | H |
| Self-Refresh Exit | L | H | H | X | X | X |
|  |  |  | L | H | H | H |
| Precharge | H | H | L | L | H | L |
| No Operation | H | X | L | H | H | H |

Referring to Table 1 for example, when the memory controller 2 sets CS#=L, RAS#=H, CAS#=L and WE#=L, the command decode circuit 13 decodes the signals as a write command function. It should be apparent to those skilled in the art that different and/or additional signals (e.g., BA, ADR, etc.) may be used to encode each command function. It should further be apparent to one skilled in the art that the specific state of each command signal (i.e., CS#, RAS#, etc.) used to define each command function (i.e., write, read, etc.) may be altered while remaining within the scope of the present invention.

The SDRAM 10 also includes an address register 15 responsive to an address bus 16 which carries a plurality of address signals (e.g., A0-A12, BA0, BA1, etc.). The control logic 11 and the address register 15 communicate with each other, and with a row address multiplexer circuit 17, a bank control logic circuit 18, and a column address counter/latch circuit 19, via an internal bus 20.

The bank control logic 18 is responsive to the control logic 11, the address register 15, and a refresh counter 38. The row address multiplexer 17 is also responsive to the control logic 11, the address register 15, and the refresh counter 38. A series of row latch/decoders 21 are responsive to the bank control logic 18 and the row address multiplexer 17. One row latch/decoder 21 is provided for each memory array 22. Each memory array 22 is comprised of a plurality of memory cells each operable to store one bit of information. Four memory arrays 22, labeled bank 0 through bank 3, are illustrated in FIG. 2. Accordingly, there are four row latch/decoder circuits 21, one each for controlling bank 0 through bank 3.

The column address counter/latch circuit 19 is responsive to the control logic 11 and the address register 15. A series of column decoders 23 are responsive to the bank control logic 18 and the column address counter/latch 19. One column decoder 23 is provided for each memory array 22. As discussed above, SDRAM 10 includes four memory arrays 22 labeled bank 0 through bank 3. Accordingly, there are four column decoder circuits 23, one each for controlling bank 0 through bank 3. An I/O gating circuit 24 is responsive to the column decoder circuits 23 for controlling sense amplifiers 40 within each of the memory arrays 22.

The SDRAM 10 may be accessed through a plurality of data pads 25 for either a write operation or a read operation. For a write operation, data on data pads 25 is received by receivers 26 and passed to input registers 27. A write buffer/driver circuit 28 buffers the received data which is then input to the memory arrays 22 through the I/O gating circuit 24.

Data which is to be read from the memory arrays 22 is output through the I/O gating circuit 24 to a read latch 29. From the read latch 29, the information is input to a multiplexer circuit 30 which outputs the data onto the data pads 25 through drivers 31. The drivers 31 are responsive to a data strobe generator 32 and to a delay locked loop circuit 33. The data strobe generator 32 is operable to produce data strobes for upper and lower bytes (i.e., UDQS, UDQS#, LDQS, and LDQS#) as is known in the art. The data strobes are also provided to data strobe output pads 34, input registers 27, and to the write buffer/driver 28, among others. The SDRAM 10 also includes input data mask pads 35 for receiving upper data mask signals (UDM) and lower data mask signals (LDM) for the upper bytes (DQ8-DQ15) and lower bytes (DQ0-DQ7), respectively. The data pads 25, data strobe output pads 34, and data mask pads 35 may be part of a data bus 37.

The SDRAM 10 includes an on-die termination (ODT) circuit 36 which is operable to apply an effective resistance Rtt (e.g., R1 or R2) to the data pads 25, data strobe output pads 34, and input data mask pads 35 (or to another portion of the data bus). An ODT activation circuit 39 is used to control whether the ODT circuit 36 is enabled/disabled, and thus whether Rtt is applied. In the embodiment illustrated in FIG. 2, the ODT activation circuit 39 receives the WE# and CS# signals which are sent by the system controller 2 to the DIMMs 3 and to each SDRAM 10. These signals may be rank specific (e.g., WE0# and CS#0 for rank-0, WE#1 and CS#1 for rank-1, etc.) and clocked at 1T (i.e., commands are asserted for a single clock pulse). The other command signals (e.g., RAS, CAS, ADR, BA, etc.) may continue to be clocked at 2T (i.e., commands are asserted for two consecutive clock pulses).

In the current embodiment, the ODT activation circuit 39 enters a monitoring state (i.e., snooping) when the CS# signal is inactive (i.e., high). The ODT activation circuit 39 may send a control signal to enable the ODT circuit 36 when the ODT activation circuit 39 detects an active (i.e., low) WE# signal and an inactive (i.e., high) CS# signal. The ODT circuit 36 receives the control signal from the ODT activation circuit 39 and applies Rtt to the data pads 25, data strobe output pads 34, and data mask pads 35.

The ODT activation circuit 39 may send the control signal to enable ODT circuit 36 after a first predetermined time period after WE# goes active, here the first predetermined time period is set at WL-1 clock cycles (where WL is the write latency). The ODT activation circuit 39 may send another control signal to disable ODT circuit 36 after a second predetermined time period, here the second predetermined time period is set at BL/2+2 clock cycles (where BL refers to burst length). Additionally, the ODT activation circuit 39 may send the control signal to disable ODT circuit 36 if CS# goes active (i.e., the ODT activation circuit 39 enters a non-monitoring state). The predetermined enable and disable time periods (i.e., the first and second predetermined time periods, respectively) may be chosen to ensure that the relevant signals have had an opportunity to stabilize after a command is captured. It should be apparent to one skilled in the art that the predetermined enable and disable periods my be varied while remaining within the scope of the present invention.

The current embodiment, in which the ODT activation circuit snoops the WE# signal may be referred to as "write snooping". As shown in Table 1, the precharge command is encoded with RAS#=0, CAS#=1, and WE#=0. In the current embodiment, the precharge command encoding is changed to RAS#=1, CAS#=1, and WE#=1 and the no operation command is not used (another command, such as a deselect command may be used in place of the no operation command). It should be apparent to one skilled in the art that additional changes can be made to the command encoding to enable "read snooping" to be used. For example, read snooping may be implemented by inverting the WE# signal and making any necessary changes such that encoding conflicts are eliminated. Furthermore, it should be apparent to one skilled in the art that any combination of self-termination and read/write snooping is within the scope of the present invention.

Figure 3:
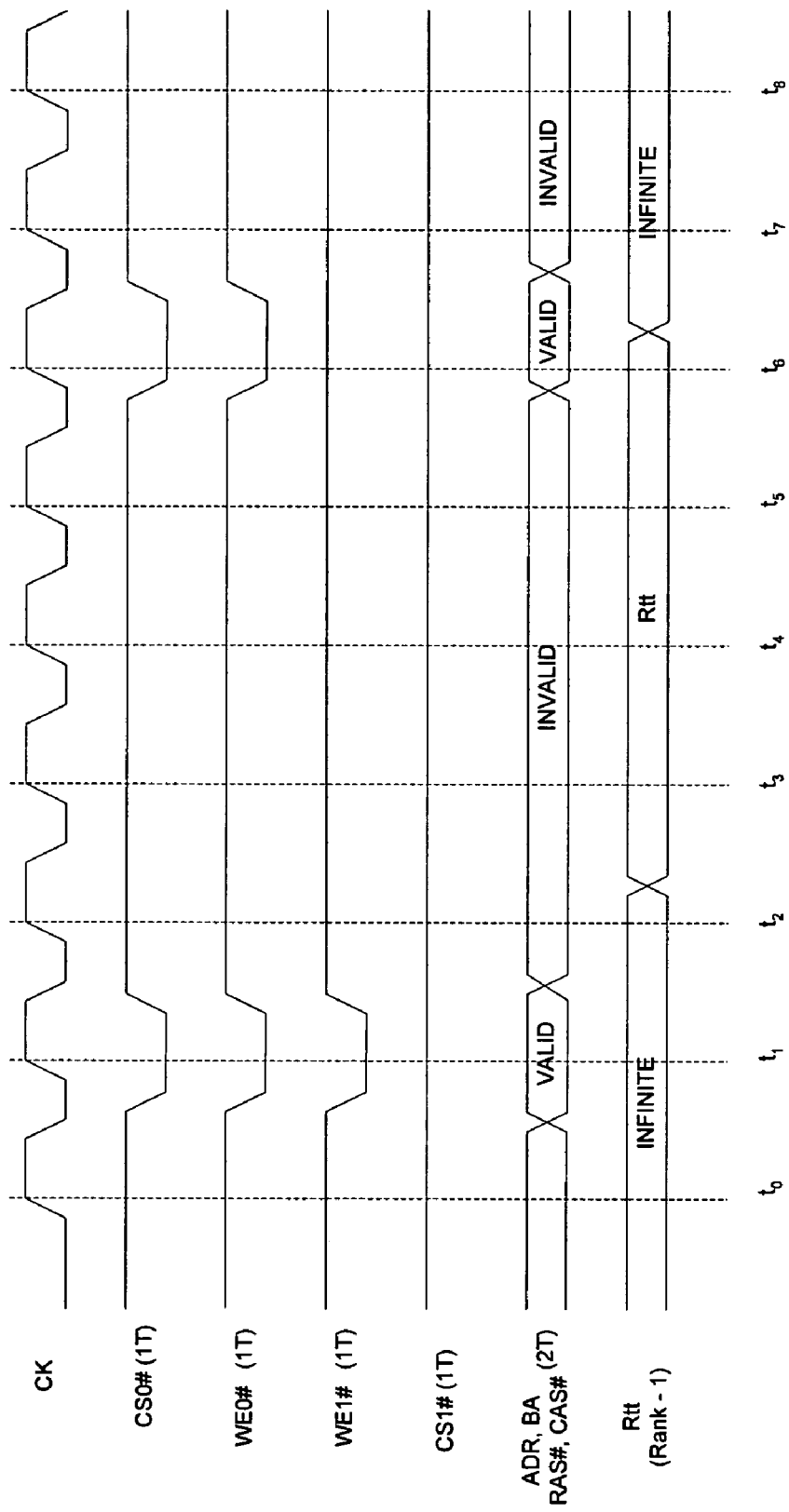
FIG. 3 illustrates timing waveforms of the on-die termination for the memory device of FIG. 2 according to one embodiment.

Referring briefly to FIG. 3, multiple waveforms illustrate the write snooping operation of the ODT for the SDRAM 10 of FIG. 2. When the chip select signal for a rank is inactive (i.e., high), the rank may be referred to as "non-selected" (i.e., the controller is not selecting the rank to execute a command) and the SDRAMs 10 in the rank snoop the command line. If a valid command is present while the rank's chip select signal is inactive (i.e., when the rank is non-selected), the SDRAMs 10 in the rank recognize that the command is not intended for them, and the SDRAMs may activate their ODT. For example at time $t_o$ in FIG. 3, both the chip select signal for rank-0 (i.e., CS0#) and the chip select signal for rank-1 (i.e., CS1#) are inactive. Thus, the SDRAMs for both rank-0 and rank-1 are said to be snooping the command bus, but neither activates its ODT because WE0# and WE1# are inactive.

At $t_1$, CS0# goes active (i.e., goes low) and a write enable signal is asserted on the command bus for both rank-0 and rank-1 (i.e., WE0# and WE1# go active). Because CS0# is active, rank-0 is referred to as "selected" and the SDRAMs in rank-0 do not change the status of their ODT. However, CS1# is still inactive (i.e., rank-1 is non-selected) and the SDRAMs in rank-1 continue snooping the command line. The SDRAMs in rank-1 sense the write enable signal asserted on the command line WE1#. Because CS1# is remains inactive (i.e., rank-1 is non-selected), the SDRAMs in rank-1 recognize that the command is intended for another rank (e.g., rank-0). Accordingly, the SDRAMs in rank-1 change the status of their ODT. As illustrated in FIG. 3, the effective resistance for the SDRAMs in rank-1 (labeled Rtt) is activated approximately one clock pulse after WE1# is sampled low (wherein CS1# is inactive (i.e., at $t_2$)). In the current embodiment, the ODT remains active for four clock pulses (i.e., until approximately $t_6$).

As seen in FIG. 3, the controller may also refrain from enabling the ODT for a non-selected rank. For example at $t_6$, CS0# goes active (i.e., goes low) and a write enable signal is asserted on the command bus for rank-0 (i.e., WE0# goes active). Because CS0# is active, the SDRAMs in rank-0 do not change the status of their ODT. However, CS1# is still inactive (i.e., rank-1 is non-selected) and the SDRAMs in rank-1 continue snooping the command line. As shown in FIG. 3 at $t_6$, the controller does not assert a write enable signal on the command bus for rank-1 (i.e., WE1# remains inactive). Thus, the SDRAMs in rank-1 do not sense a write enable signal asserted on the command line WE1#. Accordingly, the SDRAMs in rank-1 do not activate their ODT. Thus, the controller can use the write enable pin as an ODT control pin and more complex ODT termination schemes can be implemented with less pins (i.e., the actual ODT pin is eliminated) and less complexity.

The use of separate write enable pins for each rank allows the controller to precisely control the ODT for a non-selected rank in the current embodiment by simply pulsing a write enable signal to the non-selected rank. It should be apparent to one skilled in the art that control of the non-selected rank is possible regardless of the state of the write enable signal for the selected rank (i.e., regardless of the command being sent to the selected rank). For example during a write operation for rank-0 (as shown in FIG. 3), WE0# is active (e.g., at $t_1$ and $t_6$) while WE1# can be active (e.g., at $t_1$; thus activating rank-1's ODT) or inactive (e.g., at $t_6$; thus maintaining rank-1's ODT inactive). During a read operation for rank-0 (not shown), WE0# is inactive while WE1# can be active (thus activating rank-1's ODT) or inactive (thus maintaining rank-1's ODT inactive).

Additionally, it should be apparent to one skilled in the art that the controller may be used to individually control any number of ranks within a memory system. For example in a system having four ranks (e.g., rank-0 to rank-3), the controller may select rank-3 to execute a command, may pulse WE1# and WE2# (i.e., write enable signals for non-selected rank-1 and non-selected rank-2, respectively) to activate the ODT on rank-1 and rank-2, respectively, and maintain WE0# (i.e., write enable for non-selected rank-0) inactive to maintain rank-0's ODT deactivated. Furthermore, it should be apparent to one skilled in the art that additional changes can be made to such that the command pulsing can enable the ODT for "read snooping" or other snooping implementations while remaining within the scope of the present invention.

In the current embodiment, the ODT effective resistance Rtt is selected by certain bits within the extended mode register (EMR). Effective resistance values of 75 Ω and 150Ω are selectable and can be applied to the data pads 25, data strobe output pads 34, and data mask pads 35. The bits within the EMR determine which ODT resistance is enabled by turning on/off switch 'sw1,' or switch 'sw2' (as shown in FIG. 2). The ODT effective resistance value is selected by enabling switch 'sw1,' which enables all 'R1' values that are 150Ω each, enabling an effective resistance of 75Ω (i.e., Rtt='R 1'/2). Similarly, if 'sw2' is enabled, all 'R' values that are 300Ω each, enable an effective ODT resistance of 150Ω (i.e., Rtt ='R2'/2).

In the current embodiment, the 2T snooping solution is implemented by adding a copy of the write enable signal (WE#) to the DIMM connector. Accordingly, the present embodiment may be referred to as a "one pin solution". In this embodiment, the total DIMM connector pin count is reduced by one (1) pin (i.e., the two ODT pins on the DIMM connector are replaced by a single WE# pin) and each DRAM pin count is reduced by one (1) pin (i.e., the ODT pin on the DRAM is removed) as compared to conventional pin-controlled ODT.

Figure 4:
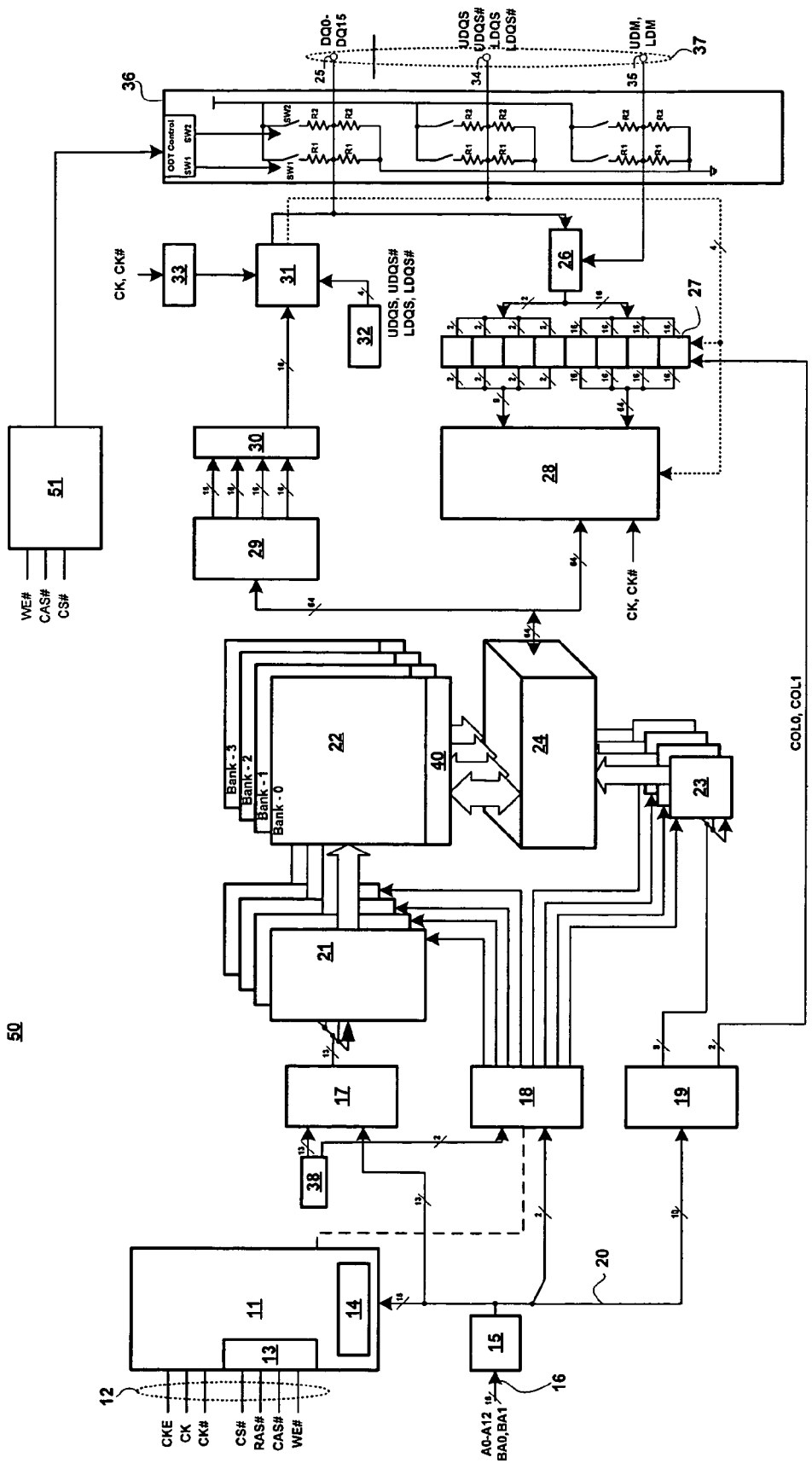
FIG. 4 illustrates a simplified functional block diagram of an architecture for the memory device of FIG. 1 according to an alternative embodiment.

FIG. 4 illustrates a simplified functional block diagram of an architecture for the SDRAM of FIG. 1 according to an alternative embodiment. The SDRAM 50 of FIG. 4 is the same as that discussed above in conjunction with FIG. 2 except that that the ODT activation circuit 51 further includes the command signal CAS# at its input. In this embodiment, 2T snooping is implemented by adding a copy of the column address strobe (CAS#) and write enable (WE#) signals to the DIMM connector. Accordingly, the embodiment of FIG. 4 may be referred to as a "two pin solution". In this embodiment, the total DIMM connector pin count stays the same (i.e., the two ODT pins on the DIMM connector are replaced by WE# and CAS# pins) and each DRAM pin count is reduced by one (1) pin (i.e., the ODT pin on the DRAM is removed) as compared to conventional pin-controlled ODT. Command signals CS#, CAS#, and WE# are clocked at 1T (i.e., commands are asserted for one clock pulse), whereas the other command signals (e.g., RAS#, ADR, BA, etc.) may continue to be clocked at 2T (i.e., commands are asserted for two consecutive clock pulses).

The use of both WE# and CAS# pins allows read and/or write snooping without changing the command coding. Referring to Table 1, ODT is not controlled in the current embodiment unless CAS#=0, and WE#=0 for write snooping or CAS#=0, and WE#=1 for read snooping. The only non-read/write commands that use CAS#=L are Load Mode, Refresh, and Self-Refresh. Thus, the controller must give special consideration while executing these commands. It should be apparent to those skilled in the art, however, that changing the command coding may eliminate the case in which the controller must give special attention while executing the Load Mode, Refresh, and Self-Refresh commands. For example, the Refresh and Self-Refresh commands currently use (as shown in Table 1) RAS#=1,CAS#=1 and WE#=1. By encoding the Refresh and Self-Refresh commands as RAS#=1,CAS#=1 and WE#=0 (a currently unused encoding), the controller does not have to give special attention while executing the Load Mode, Refresh, and Self-Refresh commands.

Figure 5:
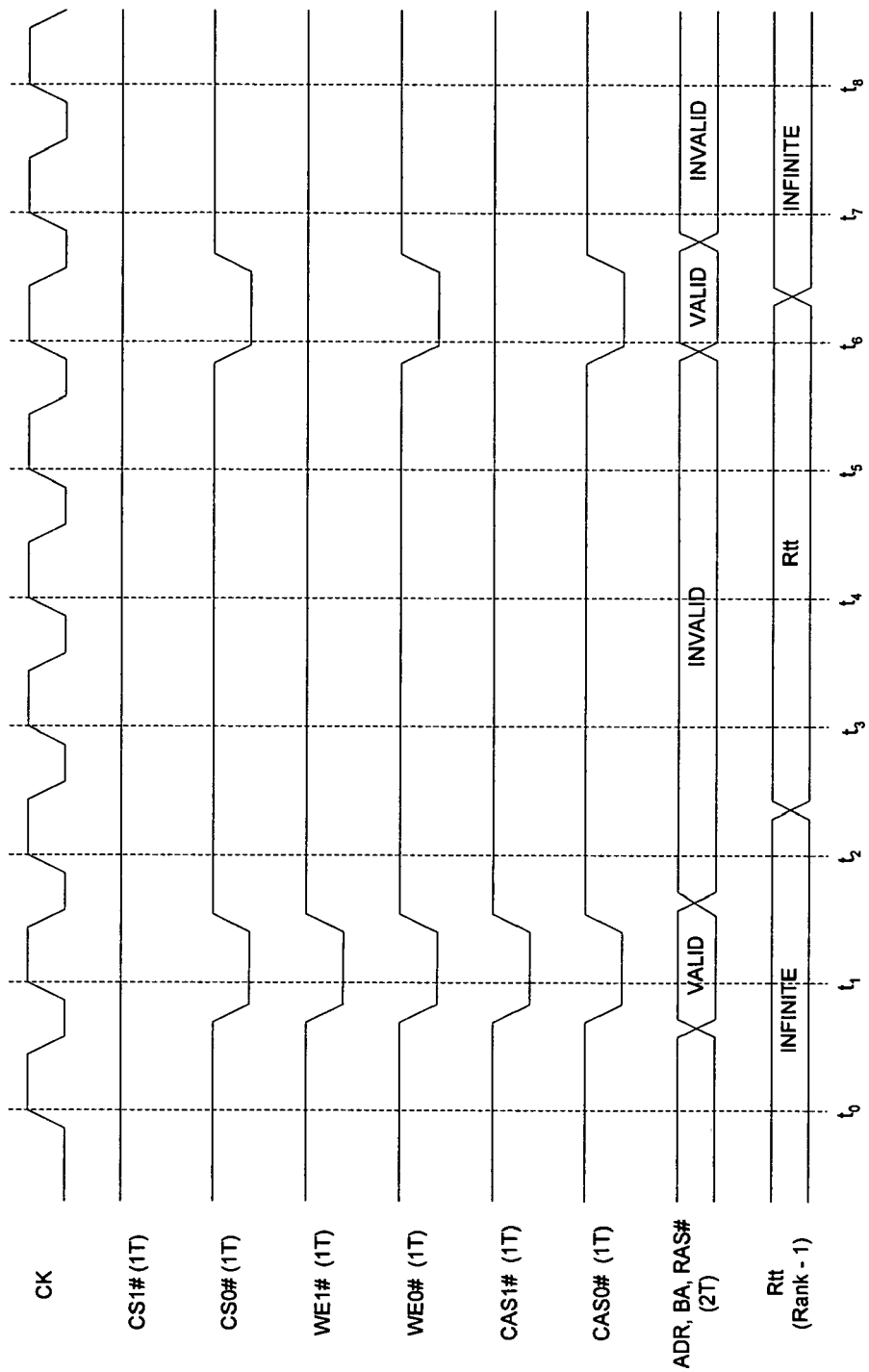
FIG. 5 illustrates timing waveforms of the on-die termination for the memory device of FIG. 4 according to one embodiment.

FIG. 5 illustrates timing waveforms of the on-die termination for the SDRAM 50 of FIG. 4 according to one embodiment. At time t0, both the chip select signal for rank-0 (i.e., CS0#) and the chip select signal for rank-1 (i.e., CS1#) are inactive. Additionally, CAS0#, CAS1#, WE0#, and WE1# are inactive. Thus, the SDRAMs for both rank-0 and rank-1 are said to be write snooping the command bus, but neither activates its ODT because there is no valid command present on the command line.

At $t_1$, CS0# goes active (i.e., goes low), WE0# and WE1# go active, and CAS0# and CAS1# go active. Additionally, a valid command is asserted on the command bus. Because CS0# is active, the SDRAMs in rank-0 do not change the status of their ODT. However, CS1# is still inactive and the SDRAMs in rank-1 continue snooping the command line.

The SDRAMs in rank-1 sense the valid command on the command bus and recognize that the command is intended for another rank (here, rank-0). Accordingly, the SDRAMs in rank-1 change the status of their ODT. As illustrated in FIG. 5, the effective resistance for the SDRAMs in rank-1 (labeled Rtt) is activated approximately one clock pulse after the valid command is asserted on the command bus (i.e., at $t_2$)). In the current embodiment, the ODT remains active for four clock pulses (i.e., until approximately $t_6$).

As discussed above in conjunction with FIG. 3, the controller can precisely control the ODT for non-selected ranks. In the current embodiment, the use of separate write enable and column address strobe pins for each rank allows the controller to precisely control the ODT for a non-selected rank by simply pulsing a write enable and column address strobe signal to the non-selected rank. It should be apparent to one skilled in the art that control of the non-selected rank is possible regardless of the state of the write enable signal for the selected rank (i.e., regardless of the command being sent to the selected rank).

Figure 6:
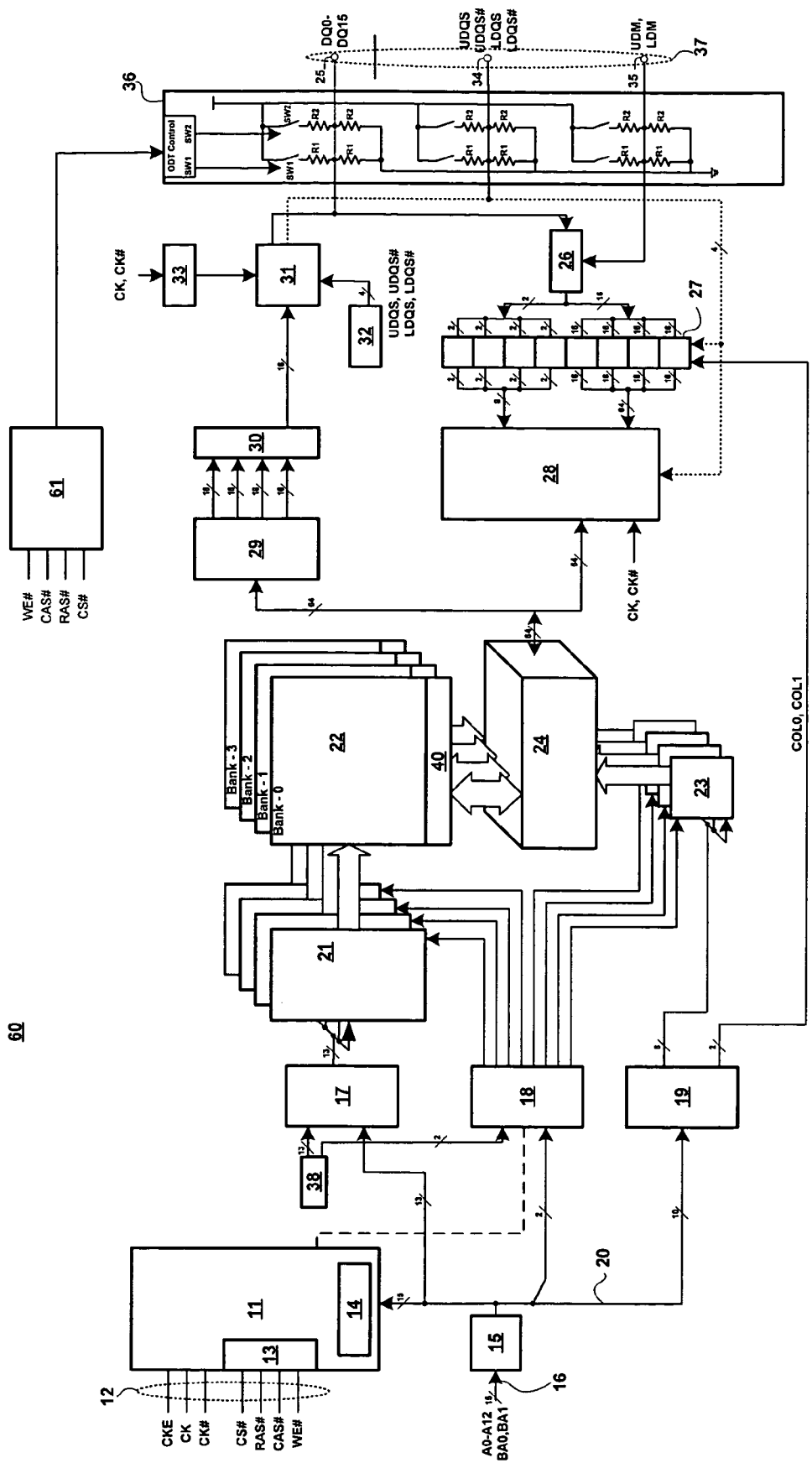
FIG. 6 illustrates a simplified functional block diagram of an architecture for the memory device of FIG. 1 according to yet another alternative embodiment.

FIG. 6 illustrates a simplified functional block diagram of ODT activation circuit for the SDRAM 60 of FIG. 2 according to yet another alternative embodiment. The SDRAM 60 of FIG. 6 is the same as that discussed above in conjunction with FIG. 2 except that that the ODT activation circuit 61 further includes the command signals CAS# and RAS# at its input. In the embodiment illustrated in FIG. 6, 2T snooping is implemented by adding a copy of the column address strobe (CAS#), the row address strobe (RAS#), and write enable (WE#) signals to the DIMM connector. Accordingly, the embodiment of FIG. 6, may be referred to as a "three pin solution". In this embodiment, the total DIMM connector pin count is increased by one (1) (i.e., the two ODT pins on the DIMM connector are replaced by WE#, CAS#, and RAS# pins) and each DRAM pin count is reduced by one (1) pin (i.e., the ODT pin on the DRAM is removed) as compared to conventional pin-controlled ODT. In the three-pin solution, the RAS#, CAS#, and WE# command signals are run at 1T, thus the SDRAMs always see the correct commands when snooping. The other command signals (e.g., ADR, BA, etc.) may continue to be clocked at 2T.

Figure 7:
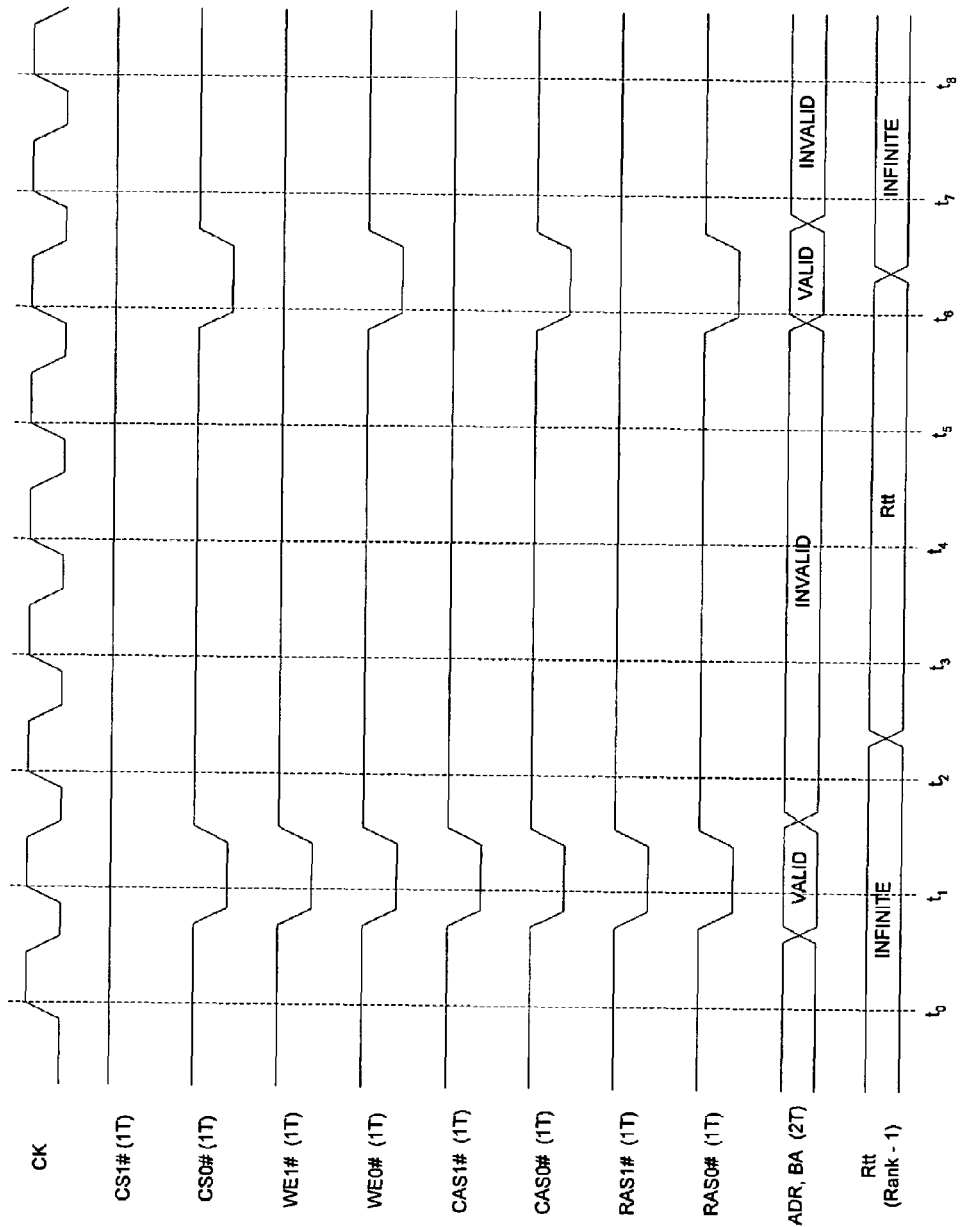
FIG. 7 illustrates timing waveforms of the on-die termination for the memory device of FIG. 6 according to one embodiment.
Figure 8:
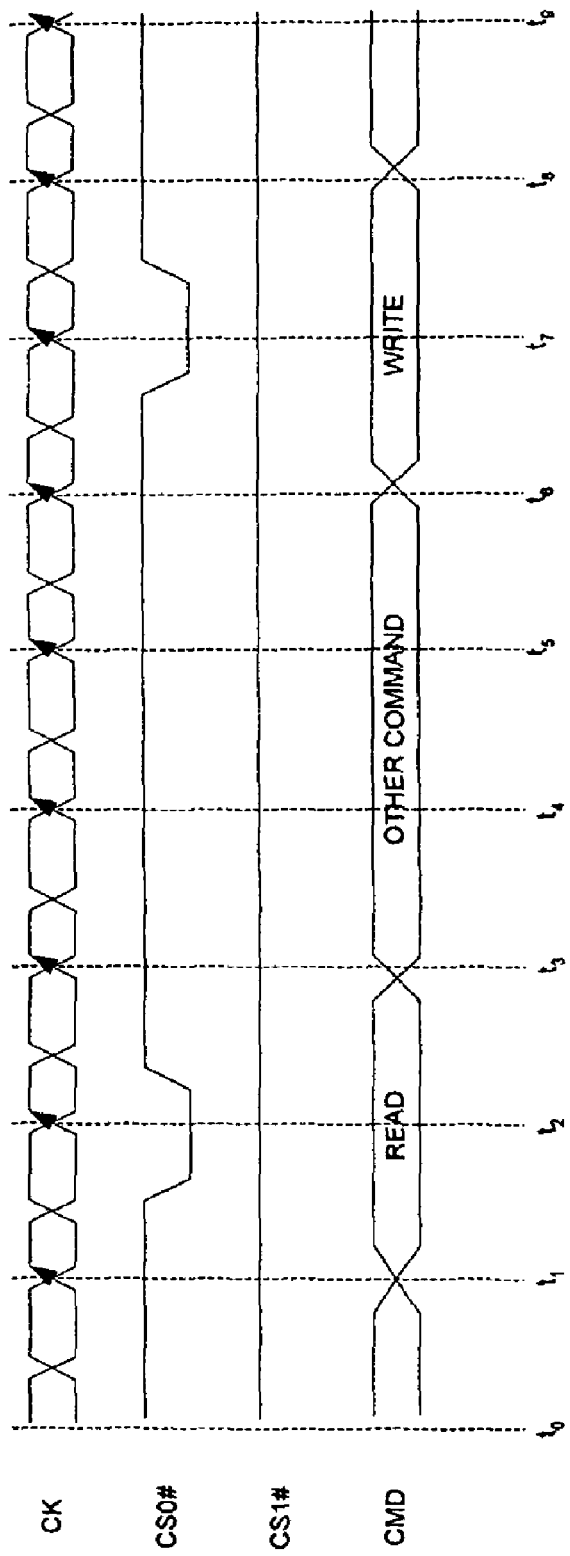
FIG. 8 illustrates timing waveforms of on-die termination for a memory rank using a prior art SDRAM running at 2T.

FIG. 7 illustrates timing waveforms of the on-die termination for the SDRAM 60 of FIG. 6 according to one embodiment. At time $t_0$, both the chip select signal for rank-0 (i.e., CS0#) and the chip select signal for rank-1 (i.e., CS1#) are inactive. Additionally, CAS#, RAS#, and WE# are inactive. Thus, the SDRAMs for both rank-0 and rank-1 are said to be snooping the command bus, but neither activates its ODT because there is no valid command present on the command line.

At $t_1$, CS0#, CAS0#, CAS1#, RAS0#, RAS1#, WE0#, and WE1# go active (i.e., goes low) and a valid command is asserted on the command bus. Because CS0# is active, the SDRAMs in rank-0 do not change the status of their ODT. However, CS1# is still inactive and the SDRAMs in rank-1 continue snooping the command line. The SDRAMs in rank-1 sense the valid command on the command bus and recognize that the command is intended for another rank (here rank-0). Accordingly, the SDRAMs in rank-1 change the status of their ODT. As illustrated in FIG. 7, the effective resistance for the SDRAMs in rank-1 (labeled Rtt) is activated approximately one clock pulse after the valid command is asserted on the command bus (i.e., at $t_2$)). In the current embodiment, the ODT remains active for four clock pulses (i.e., until approximately $t_6$).

As discussed above in conjunction with FIGS. 3 and 5, the controller can precisely control the ODT for non-selected ranks. In the current embodiment, the use of separate write enable, column address strobe, and row address strobe pins for each rank allows the controller to precisely control the ODT for a non-selected rank in the current embodiment by simply pulsing a write enable, column address strobe, and row address strobe signal to the non-selected rank. It should be apparent to one skilled in the art that control of the non-selected rank is possible regardless of the state of the write enable signal for the selected rank (i.e., regardless of the command being sent to the selected rank).

It should be recognized that the above-described embodiments of the invention are intended to be illustrative only. Numerous alternative embodiments may be devised by those skilled in the art without departing from the scope of the following claims.

Figure 9:
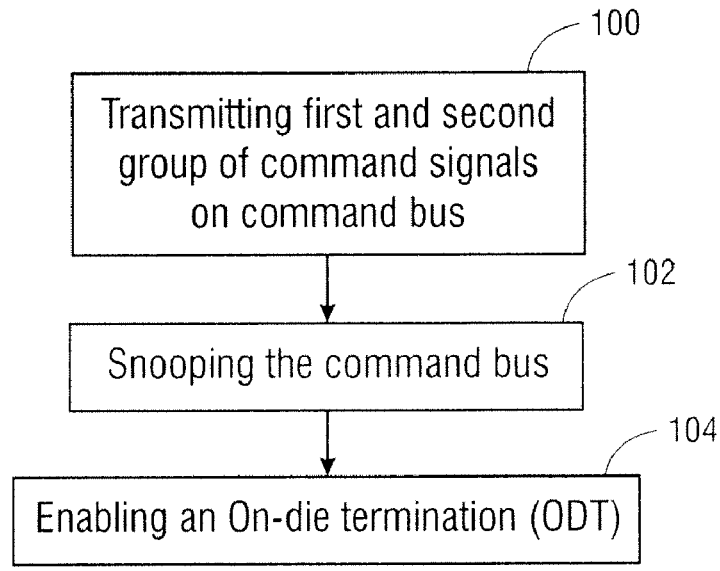
FIGS. 9 and 10 summarize two embodiments of the present invention.

FIG. 9 summarizes one embodiment of the present invention which relates to a method for controlling the on-die termination of a memory system having a plurality of memory devices, a command bus, and a data bus. In FIG. 9, the method comprises transmitting a first and a second group of command signals on a command bus 100, snooping the command bus 102, wherein the snooping is responsive to a first plurality of command signals clocked at 1 T, and enabling the on-die termination of the memory device 104.

Figure 10:
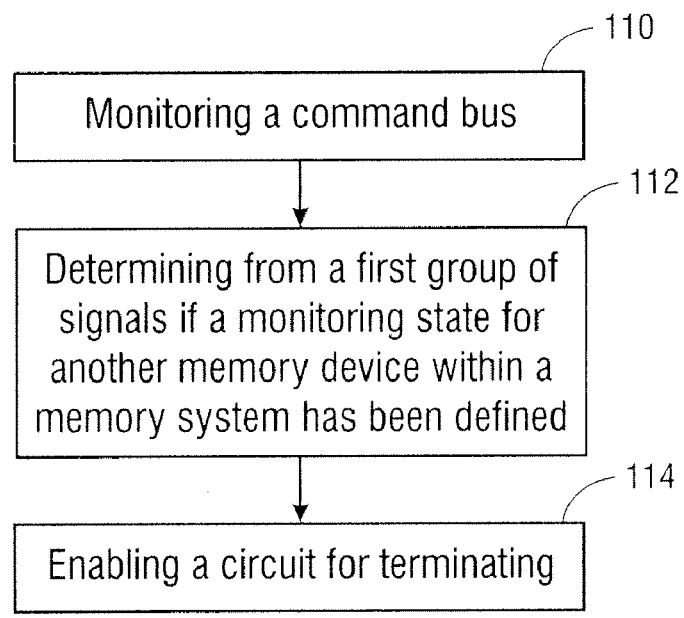

FIG. 10 summarizes another embodiment of the present invention which relates to a method for terminating a data bus within a memory device of a memory system. The method comprises monitoring a command bus 110 within the memory system if a first plurality of signals define a monitoring state for the memory device, determining 112 if the first plurality of signals and a second plurality of signals define a command function for another memory device within the memory system, wherein the first plurality of signals are clocked at 1 T and wherein the second plurality of signals are clocked at 2T, and enabling 114 a circuit for terminating the data bus.

What is claimed is:

1. A method for controlling the on-die termination of a memory system having a plurality of memory devices, a command bus, and a data bus, said method comprising:
   transmitting a first group of command signals and a second group of command signals on said command bus, wherein command signals within said first group are asserted for a single clock pulse and command signals within said second group are asserted for two consecutive clock pulses, and wherein a valid command comprises a command signal from said first group and a command signal from said second group;
   snooping said command bus, said snooping being responsive to only command signals within said first group of command signals; and
   enabling the on-die termination of at least one of said plurality of memory devices, said enabling responsive to said snooping.

2. The method of claim 1 wherein said snooping further comprises:
   receiving a write enable signal and a chip select signal, each of said write enable signal and said chip select signal having a first state and a second state for encoding a plurality of commands and for selecting at least one of said plurality of memory devices;
   snooping only said chip select signal and said write enable signal on said command bus with one or more non-selected memory devices when said chip select signal and said write enable signal define one of a read or a write command for said at least one selected memory device.

3. The method of claim 1 wherein said snooping further comprises:
   receiving a column address strobe, a write enable signal, and a chip select signal, each of said column address strobe, said write enable signal, and said chip select signal having a first state and a second state for encoding a plurality of commands and for selecting at least one of said plurality of memory devices; and
   snooping only said chip select signal, said column address strobe, and said write enable signal on said command bus with one or more non-selected memory devices when said column address strobe, said chip select signal, and said write enable signal define one of a read or a write command for said at least one selected memory device.

4. The method of claim 1 wherein said snooping further comprises:
   receiving a column address strobe, a row address strobe, a write enable signal, and a chip select signal, each of said column address strobe, said row address strobe, said write enable signal, and said chip select signal each having a first state and a second state for encoding a plurality of commands and for selecting at least one of said plurality of memory devices; and
   snooping said command bus with one or more non-selected memory devices when said column address strobe, row address strobe, said chip select signal, and said write enable signal define one of a read or a write command for said at least one selected memory device.

5. The method of claim 1 wherein said enabling the on-die termination of at least one of said plurality of memory devices comprises controlling the amount of effective resistance that is applied to said data bus.

6. The method of claim 5 wherein said enabling the on-die termination of at least one of said plurality of memory devices further comprises controlling the amount of effective resistance that is applied to at least one of a data pad, a data strobe output pad, and an input data mask pad, wherein said at least one of said data pad, said data strobe output pad, and said input data mask pad form at least a portion of said data bus.

7. The method of claim 1 wherein said enabling the on-die termination of at least one of said plurality of memory devices occurs a predetermined time after receiving certain command signals from said first group of command signals.

8. The method of claim 7 further comprising disabling said on-die termination of at least one of said plurality of memory devices device a predetermined time after said enabling.

9. The method of claim 1 wherein said enabling the on-die termination of at least one of said plurality of memory devices occurs a predetermined time period after receiving certain command signals from said second group of command signals.

10. The method of claim 9 further comprising disabling said on-die termination of at least one of said plurality of memory devices device a predetermined time period after said enabling.

11. A method for terminating a data bus within a memory device of a memory system, said method comprising:
   monitoring a command bus within said memory system, wherein said command bus carries a first group of command signals asserted for a single clock pulse and a second group of command signals asserted for two consecutive clock pulses, and wherein a valid command comprises a command signal from said first group and a command signal from said second group;

determining from said first group of signals if a monitoring state for another memory device within said memory system has been defined; and enabling a circuit for terminating said data bus in response to only signals within said first group of command signals.

12. The method of claim 11 further comprising:

ignoring said command bus if said first group of signals define a non-monitoring state for said memory device; and disabling said circuit for terminating said data bus.

13. The method of claim 11 wherein said enabling a circuit for terminating said data bus comprises controlling the amount of effective resistance that is applied to said data bus.

14. The method of claim 11 wherein said enabling a circuit for terminating said data bus occurs a predetermined time period after said first group of signals and said second group of signals define a command function for said another memory device.

15. The method of claim 14 further comprising setting said predetermined time period in response to a write latency of said memory device.

16. The method of claim 11 further comprising disabling said circuit for terminating said data bus a predetermined time period after said enabling.

17. The method of claim 16 further comprising setting said predetermined time period in response to one of a command burst length and a data burst length of said memory device.

18. A memory device, comprising a memory array responsive to a plurality of command signals;

a data bus for carrying data to and from said memory array, said data bus having at least one of a data pad, a data strobe output pad, and an input data mask pad;

a command bus for carrying a plurality of command signals to said memory array, wherein a first group of said plurality of command signals are asserted for a single clock pulse and a second group of said plurality of command signals are asserted for two consecutive clock pulses, and wherein a valid command comprises a command signal from said first group and a command signal from said second group;

an activation circuit responsive to only command signals of the first group of command signals, said activation circuit operable to produce a control signal; and a termination circuit responsive to said control signal, said termination circuit operable to apply an effective resistance to at least one of said data pad, said data strobe output pad, and said input data mask pad.

19. The memory device of claim 18 further comprising control logic for decoding said plurality of command signals, said memory array being responsive to said control logic.

20. The memory device of claim 18 wherein said certain of said plurality of command signals includes at least one of a chip select signal, a row address strobe, a column address strobe, and a write enable signal.

21. The memory device of claim 18, wherein said activation circuit receives only a write enable signal and a chip select signal.

22. The memory device of claim 21, wherein said write enable signal and chip select signal are rank specific signals.

23. The memory device of claim 18, wherein said activation circuit receives only a write enable signal, a column address strobe signal, and a chip select signal.

24. The method of claim 1, wherein said command signal from said first group qualifies said command signal from said second group.

25. A memory system, comprising:

a memory controller for issuing a plurality of command signals; and a memory module responsive to said memory controller, said memory module having one or more ranks with one or more memory devices, at least one of said memory devices comprised of:

a memory array responsive to said plurality of command signals;

a data bus for carrying data to and from said memory array, said data bus having at least one of a data pad, a data strobe output pad, and an input data mask pad;

a command bus for carrying a plurality of command signals to said memory array, wherein a first group of said plurality of command signals are asserted for a single clock pulse and a second group of said plurality of command signals are asserted for two consecutive clock pulses, and wherein a valid command comprises a command signal from said first group and a command signal from said second group;

an activation circuit responsive to only command signals of the first group of said plurality of command signals, said activation circuit operable to produce a control signal; and a termination circuit responsive to said control signal, said termination circuit operable to apply an effective resistance to at least one of said data pad, said data strobe output pad, and said input data mask pad.

26. The memory system of claim 25 wherein said at least one of said memory devices is further comprised of a control logic for decoding said plurality of command signals, said memory array being responsive to said control logic.

27. The memory system of claim 25 wherein said certain of said first group of command signals includes at least one of a chip select signal, a row address strobe, a column address strobe, and a write enable signal.

* * * * *